US012660941B2

(12) United States Patent
Nakada et al.

(10) Patent No.: US 12,660,941 B2
(45) Date of Patent: Jun. 23, 2026

(54) SHEET FASTENER

(71) Applicant: YKK Corporation, Tokyo (JP)

(72) Inventors: Satoshi Nakada, Macon, GA (US);
Evan Fegan, Macon, GA (US)

(73) Assignee: YKK Corporation, Tokyo (JP)

( * ) Notice: Subject to any disclaimer, the term of this
patent is extended or adjusted under 35
U.S.C. 154(b) by 128 days.

(21) Appl. No.: 18/027,037

(22) PCT Filed: Sep. 20, 2021

(86) PCT No.: PCT/US2021/051016
§ 371 (c)(1),
(2) Date: Mar. 17, 2023

(87) PCT Pub. No.: WO2022/066548
PCT Pub. Date: Mar. 31, 2022

(65) Prior Publication Data
US 2023/0371708 A1      Nov. 23, 2023

Related U.S. Application Data

(60) Provisional application No. 63/081,999, filed on Sep.
23, 2020.

(51) Int. Cl.
*A47C 31/02*          (2006.01)
*F16B 2/10*          (2006.01)
(52) U.S. Cl.
CPC .............. *A47C 31/023* (2013.01); *F16B 2/10*
(2013.01)
(58) Field of Classification Search
CPC .... F16B 2/10; F16B 2/02; F16B 5/008; F16B
5/0084; B68G 7/12; A47C 31/023;
(Continued)

(56) References Cited

U.S. PATENT DOCUMENTS 4,263,698 A      4/1981   Moertel
4,878,763 A  *  11/1989   Ausnit ............... B65D 33/2541
24/585.12
(Continued)

FOREIGN PATENT DOCUMENTS

CN        102741153 A      10/2012
CN        106798469 A       6/2017
(Continued)

OTHER PUBLICATIONS

International Search Report, PCT Patent Application No. PCT/
US2021/051016, mailed Dec. 17, 2021, 2 pages.
(Continued)

*Primary Examiner* — Jason W San
*Assistant Examiner* — Louis A Mercado
(74) *Attorney, Agent, or Firm* — Kilpatrick Townsend &
Stockton LLP

(57)          ABSTRACT
A sheet fastener for fastening a pair of sheet edges includes
a first member and a second member. The first member
includes a first fixing portion configured to engage a first
edge of the pair of sheet edges and a holder continuous with
the first fixing portion. The holder defines a first recess and
includes a projection and a support portion that define an
opening to the first recess. The second member includes a
second fixing portion configured to engage a second edge of
the pair of sheet edges and a head continuous with the
second fixing portion. The head includes a front edge
opposite from the second fixing portion and a head surface
extending from the second fixing portion to the front edge.
The head is insertable into the first recess such that a portion
of the head surface maintains contact with the projection of
the holder.

4 Claims, 6 Drawing Sheets

(58) Field of Classification Search
CPC ........ Y02A 40/25; B60N 2/5825; B60N 2/80;
Y10T 29/486; Y10T 24/45152; Y10T
24/4522; Y10T 24/45105; A44B 11/25;
A44B 11/2588; Y10S 24/50
See application file for complete search history.

(56) References Cited

U.S. PATENT DOCUMENTS

| | | | | |
|---|---|---|---|---|
| 8,157,324 | B2 * | 4/2012 | Matsuzaki | ........... B60N 2/5883 |
| | | | | 297/218.4 |
| 9,161,635 | B2 * | 10/2015 | Toribuchi | ............. A47C 31/023 |
| 10,081,277 | B2 * | 9/2018 | Moroi | ...................... B68G 7/12 |
| 11,857,080 | B2 * | 1/2024 | Adachi | .................. A47C 31/02 |
| 2015/0047158 | A1 | 2/2015 | Toribuchi et al. | |
| 2017/0099915 | A1 | 4/2017 | Nakada et al. | |
| 2018/0271228 | A1 | 9/2018 | Nakada et al. | |
| 2020/0237058 | A1 | 7/2020 | Nakada et al. | |
| 2021/0112993 | A1 | 4/2021 | Adachi | |

FOREIGN PATENT DOCUMENTS

| | | | | |
|---|---|---|---|---|
| JP | 2005-118439 | A | 5/2005 | |
| WO | WO-2011145193 | A1 * | 11/2011 | ........... A47C 31/023 |
| WO | 2019/225001 | A1 | 11/2019 | |

OTHER PUBLICATIONS

Written Opinion, PCT Patent Application No. PCT/US2021/051016, mailed Dec. 17, 2021, 3 pages.
PCT Patent Application No. PCT/US2021/051016, International Preliminary Report on Patentability, Apr. 6, 2023, 5 pages.
Office Action, Japanese Patent Application No. 2023-510471, Oct. 10, 2023, 5 pages.
Office Action, Chinese Patent Application No. 202180064890.0, Jun. 3, 2025, 15 pages.

* cited by examiner

FIG. 10

SHEET FASTENER

TECHNICAL FIELD

This application relates to a sheet fastener for fastening overlaid edges of a covering material.

BACKGROUND ART

Sheet fasteners have typically been used for fastening overlaid edges of a covering material. For example, an automobile seat may include a covering material over a cushion material to form a seat surface, a back surface, a headrest surface, an armrest surface, etc. However, the use of sheet fasteners is not limited to automobiles or seats and instead may be used on various other products with covering material, including but not limited to seats for a train, seats for an aircraft, seats for a ship, seats used at a school or office, a cushioned area of sports gear, furniture such as a sofa or bed, etc. Existing sheet fasteners may be difficult for an installer to assemble and may require a lengthy installation time. Moreover, existing sheet fasteners do not accommodate different covering materials having different thicknesses and they may have decreased engagement strength depending on a thickness of the covering material. The decreased engagement strength may allow the sheet fasteners to be visible after installation, which may be undesirable in various products.

SUMMARY OF INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Description of Embodiments section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a sheet fastener for fastening a pair of sheet edges includes a first member and a second member. The first member includes a first fixing portion and a holder continuous with the first fixing portion. In various embodiments, the first fixing portion is configured to engage a first edge of the pair of sheet edges. In certain embodiments, the holder defines a first recess and includes a projection and a support portion, and the projection and the support portion define an opening to the first recess. The second member includes a second fixing portion and a head continuous with the second fixing portion. In various embodiments, the second fixing portion is configured to engage a second edge of the pair of sheet edges. The head includes a front edge opposite from the second fixing portion and a head surface extending from the second fixing portion to the front edge. In various embodiments, the head is insertable into the first recess of the holder such that a portion of the head surface maintains contact with the projection of the holder. In some embodiments, the first recess includes a non-planar recess surface. In various embodiments, the first member may include a step portion between the first fixing portion and the holder such that the holder is offset from the first fixing portion. In certain embodiments, the head is insertable into the first recess of the holder such that a portion of the head surface proximate to the front edge and a portion of the head surface proximate to the second fixing portion contact the recess surface. In some embodiments, the front edge may be offset below a plane defined by a fixing surface of the second fixing portion such that a vertical gap is defined between the plane and the front edge.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF DRAWINGS

The features and components of the following figures are illustrated to emphasize the general principles of the present disclosure. Corresponding features and components throughout the figures can be designated by matching reference characters for the sake of consistency and clarity.

FIG. 10 is a side view of another sheet fastener including a first member and a second member according to embodiments of the disclosure.

DESCRIPTION OF EMBODIMENTS

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

Described herein are sheet fasteners for fastening a pair of sheet edges. The sheet fastener includes a first member and a second member that can be assembled with the first member. The first member includes a first fixing portion that can engage one of the sheet edges and also includes a holder continuous with the first fixing portion. The holder defines a first recess and includes a projection and a support portion. In various embodiments, the projection and the support portion define an opening to the first recess. The second member includes a second fixing portion that can engage the other sheet edge and also includes a head continuous with the second fixing portion. In certain embodiments, the head includes a front edge opposite from the second fixing portion and a head surface extending from the second fixing portion to the front edge. The head of the second member is insertable into the first recess of the holder such that a portion of the head surface maintains contact with the projection of the holder. The pair of sheet edges are fastened by connecting the first member with the second member.

Figure 1:
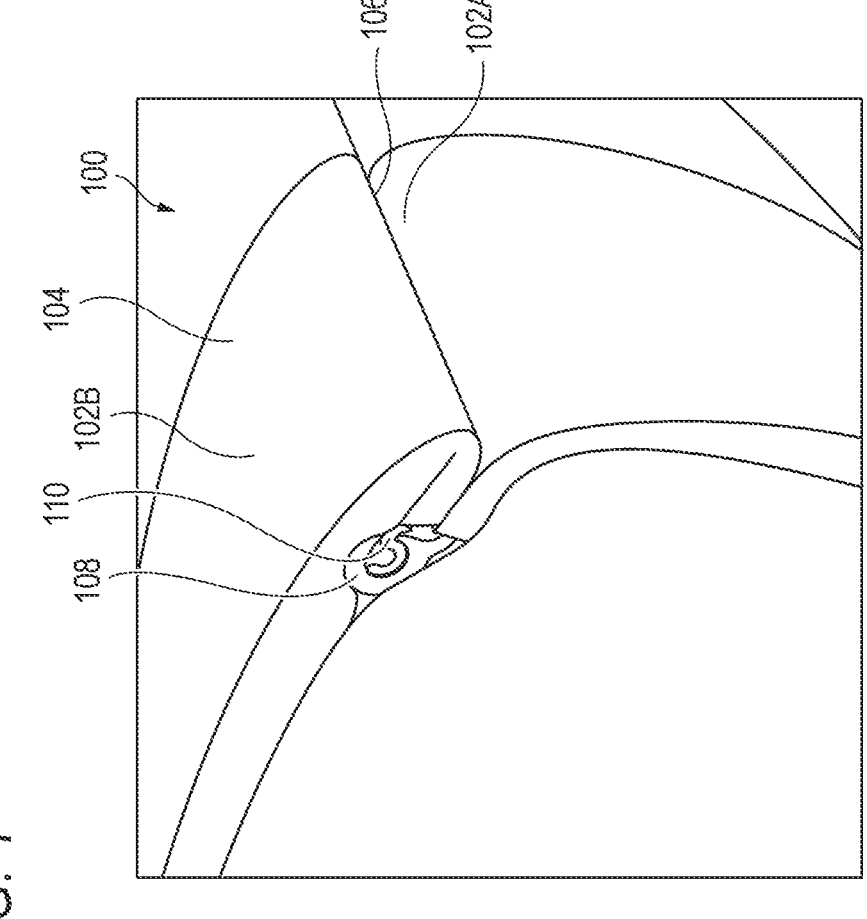
FIG. 1 is a perspective view of a covering material with overlaid edges fastened by a sheet fastener having a first member and a second member according to embodiments of the disclosure.

FIGS. 1 to 7 illustrate a sheet fastener 100 according to various embodiments. As illustrated in FIG. 1, the sheet fastener 100 may fasten a pair of sheet edges 102A and 102B of a covering material 104 along a seam 106. It will be understood that the sheet fastener 100 may be used to join any pair of sheet edges, and the sheet edges need not be edges of the same covering material.

As best illustrated in FIGS. 2 to 5, the sheet fastener 100 includes a first member 108 and a second member 110. The first member 108 and the second member 110 may each be a continuous member and may be manufactured from various suitable materials and by various suitable forming techniques. As a non-limiting example, the first member 108 and the second member 110 may each be a synthetic resin material formed by extrusion molding, injection molding, or other suitable techniques as desired.

The first member 108 includes a first fixing portion 112 and a holder 114 that is continuous with the first fixing portion 112. In various embodiments, the first fixing portion 112 includes an end 116 of the first member 108, and the holder 114 is provided opposite from the end 116. The first fixing portion 112 includes a first fixing surface 118 on which a sheet edge (e.g., sheet edge 102A) may be fixed via various suitable mechanisms or techniques. In one non-limiting example, the sheet edge may be sewn to the first fixing surface 118. In various embodiments, the first fixing surface 118 extends in a first plane 120.

Figures 2, 3:
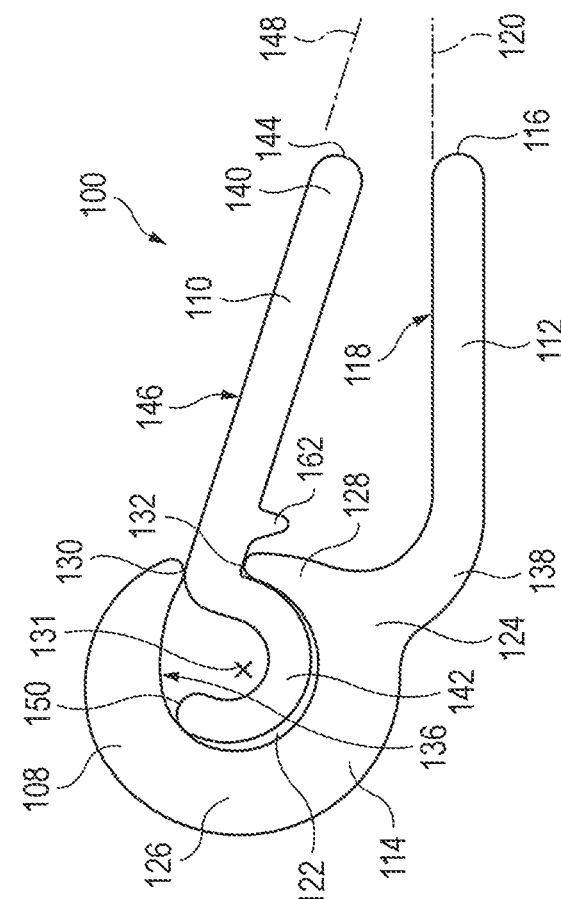
FIG. 2 is a side view of the sheet fastener of FIG. 1.
FIG. 3 is another side view of the sheet fastener of FIG. 1.

The holder 114 of the first member 108 defines a first recess 122 and includes a connecting portion 124, a support portion 126, and a projection 128. The support portion 126 extends from the connecting portion 124 and surrounds the first recess 122, and the support portion 126 includes a support portion edge 130. The projection 128 extends from the connecting portion 124 in a direction opposite from the support portion 126 and towards the support portion edge 130. In some embodiments, the projection 128 may be continuous with and/or otherwise connected to a first recess surface 136 of the first recess 122, and in certain embodiments, the projection 128 may optionally extend from a non-planar portion of the first recess surface 136. The projection 128 may have various suitable shapes or profiles as desired, and the arcuate shape of the projection 128 illustrated in FIGS. 1 to 7 should not be considered limiting on the disclosure. The projection 128 includes a projection edge 132, and the support portion edge 130 and the projection edge 132 together define an opening to the first recess 122. The first recess 122 includes the first recess surface 136. Optionally, the first recess surface 136 may be non-planar. As a non-limiting example, the first recess surface 136 may be arcuate shaped, and in the embodiment of FIGS. 1 to 7, the first recess surface 136 is substantially in a C-shape. In other embodiments, at least a portion of the first recess surface 136 may be planar. In certain embodiments, and as illustrated in FIG. 2, the first recess 122 has a center 131, which may be an axis that may extend along a length of the first recess 122 (e.g., in a direction into and out of the page in FIG. 2). It will be understood that in certain embodiments, the shape or profile of the first recess 122 may not be a perfect circle and may have various shapes or profiles as desired. In certain embodiments, only sub-portions of the first recess surface 136 may be arcuate-shaped. Similarly, and as discussed below, a shape of a head 142 of the second member 110 may be a perfect circle or may have other shapes as desired. In some embodiments, at least a portion of the first recess surface 136 is arcuate shaped and at least a portion of the head 142 is arcuate shaped. In certain embodiments, if the partial arcuate portions of the head 142 and the first recess surface 136 make a perfect circle, the centers of the head 142 and the first recess 122 may match.

Optionally, the first member 108 includes a step portion 138 between the first fixing portion 112 and the holder 114 and continuous with the first fixing portion 112 and the holder 114. In certain aspects, the step portion 138 may offset the connecting portion 124 of the holder 114 (and thus the holder 114) such that the connecting portion 124 is above or below the first plane 120. In the embodiment of FIGS. 1 to 7, the step portion 138 offsets the connecting portion 124 above the first plane 120. In certain embodiments, the step portion 138 may allow for the sheet fastener 100 to accommodate sheet edges having various thicknesses and/or minimize a gap between the fastened sheet edges while maintaining sufficient engagement strength. In various embodiments, the operation of engaging the first member 108 with the second member 110 is also improved because the second member 110 is able to engage the first member 108 even if the sheet is thick.

Figure 4:
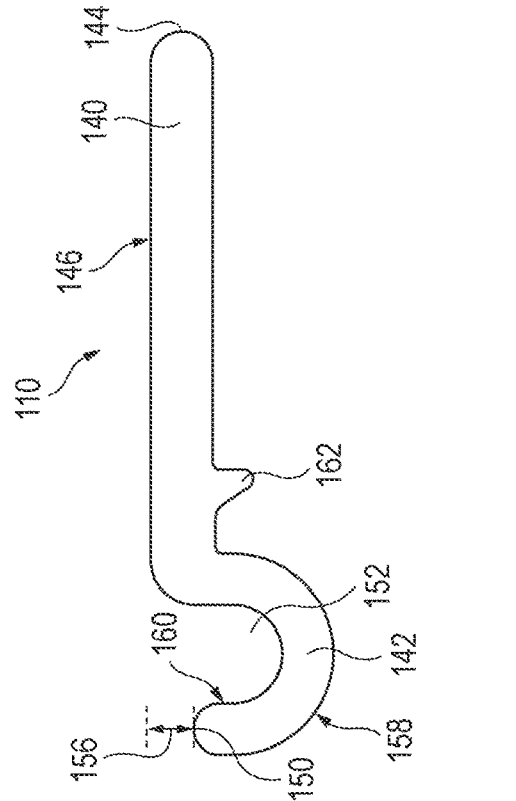
FIG. 4 is a side view of the second member of the sheet fastener of FIG. 1.

As best illustrated in FIG. 4, the second member 110 includes a second fixing portion 140 and the head 142. In various embodiments, the second fixing portion 140 includes an end 144 of the second member 110, and the head 142 is provided opposite from the end 144. Similar to the first fixing portion 112, the second fixing portion 140 includes a second fixing surface 146 on which a sheet edge (e.g., sheet edge 102B) may be fixed via various suitable mechanisms or techniques. In one non-limiting example, the sheet edge may be sewn to the second fixing surface 146. As best illustrated in FIG. 2, in various embodiments, the second fixing surface 146 extends in a second plane 148.

The head 142 of the second member 110 includes a head edge 150 and defines a second recess 152. The head edge 150 and a portion of the second fixing portion 140 connected to the head 142 together define an opening to the second recess 152. In certain aspects, and as best illustrated in FIGS. 2 and 4, the head edge 150 is offset from the second plane 148 such that a vertical gap 156 is defined between the second plane 148 and the head edge 150. As discussed in detail below, in various embodiments, the gap 156 between the head edge 150 and the second plane 148 may allow for the head 142 to be inserted deeply into the first recess 122 and improve stability of the second member 110 in a temporary position.

As illustrated in FIG. 4, for example, the head 142 includes an outer surface 158 and the second recess 152 includes a second recess surface 160. In certain aspects, the outer surface 158 and/or the second recess surface 160 may be non-planar surfaces; however, in other embodiments, at least a portion of the outer surface 158 and/or the second recess surface 160 may be planar. Similar to the first recess surface 136, it will be understood that head 142 need not be a perfect circle, and the head 142 may have various shapes or profiles as desired. In certain cases, at least a portion of the head 142 is arcuate shaped and at least a portion of the first recess surface 136 is arcuate shaped. In embodiments where both the head 142 and the first recess surface 136 are perfect circles, the centers of the respective circles may be aligned with the second member 110 assembled with the first member 108. In some embodiments, a curvature of the outer surface 158 may be complimentary to a curvature of the first recess surface 136. In such embodiments, the complimentary curvature of the outer surface 158 and the first recess surface 136 may improve contact between the first member 108 and the second member 110 and may facilitate rotational movement of the second member 110 relative to the first member 108.

In various embodiments, the second member 110 may also include a projection 162 extending from the second fixing portion 140 between the end 144 and the head 142. In certain embodiments, and as illustrated in FIGS. 2 and 3 for example, a portion of the projection 128 of the holder 114 of the first member 108 may be received between the projection 162 and the head 142 of the second member 110 when the second member 110 is fully assembled with the first member 108.

Figure 5:
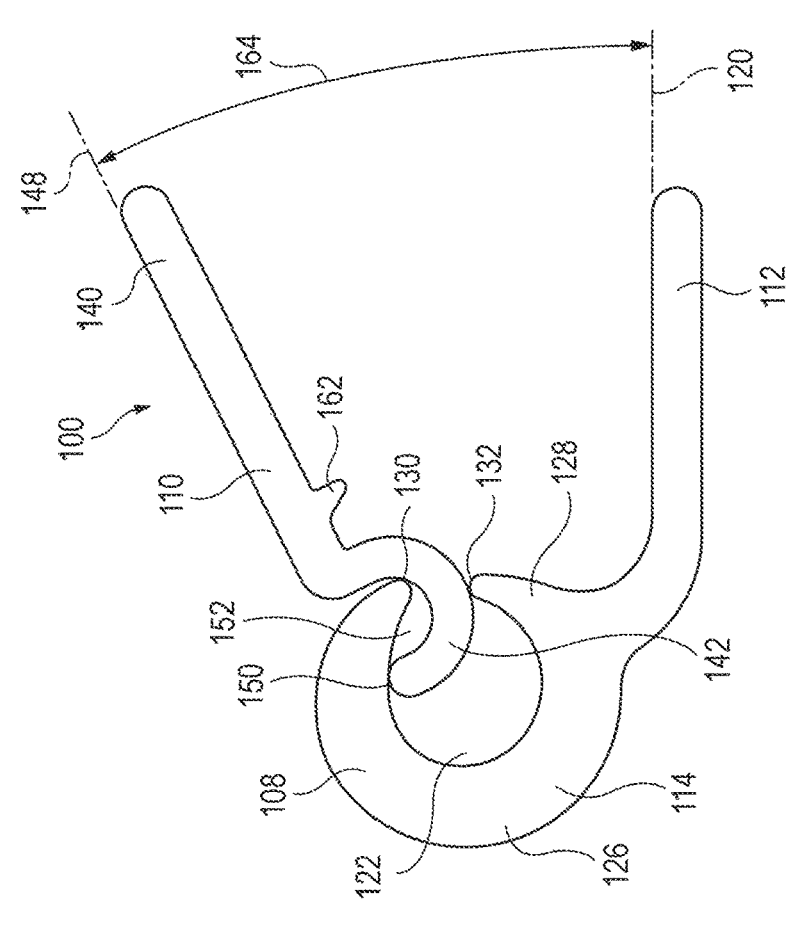
FIG. 5 is a side view of the sheet fastener of FIG. 1 with the second member in a temporary position relative to the first member.

Referring to FIGS. 3 and 5, the second member 110 may be positioned in a temporary position (FIG. 5) and a fully assembled position (FIG. 3) relative to the first member 108. In the temporary position, the head 142 is partially positioned within the first recess 122 of the holder 114. As illustrated in FIG. 5, in the temporary position, the head edge 150 may contact the first recess surface 136, the support portion edge 130 of the holder 114 is positioned in the second recess 152 and contacts the second recess surface 160 of the head 142, and the projection edge 132 contacts the outer surface 158 of the head 142. In certain embodiments, the gap 156 between the head edge 150 and the second plane 148 may facilitate initial insertion of the head 142 into the first recess 122 and to the temporary position. The gap 156 may allow for the head 142 to be inserted deeply into the first recess 122 in the temporary position, which may provide increase of support to the second member 110 in the temporary position compared to traditional sheet fasteners. In various embodiments, the gap 156 may also minimize an angle 164 between the first plane 120 and the second plane 148 in the temporary position compared to traditional sheet fasteners. In some cases, the angle 164 may be less than about 50°, and in one non-limiting example, the angle 164 may be less than about 26°. In other embodiments, the angle 164 may be greater than 50° or at other angles less than or equal to about 50° as desired. In various embodiments, the gap 156 may also facilitate movement of the second member 110 from the temporary position to the fully assembled position.

Figure 10:
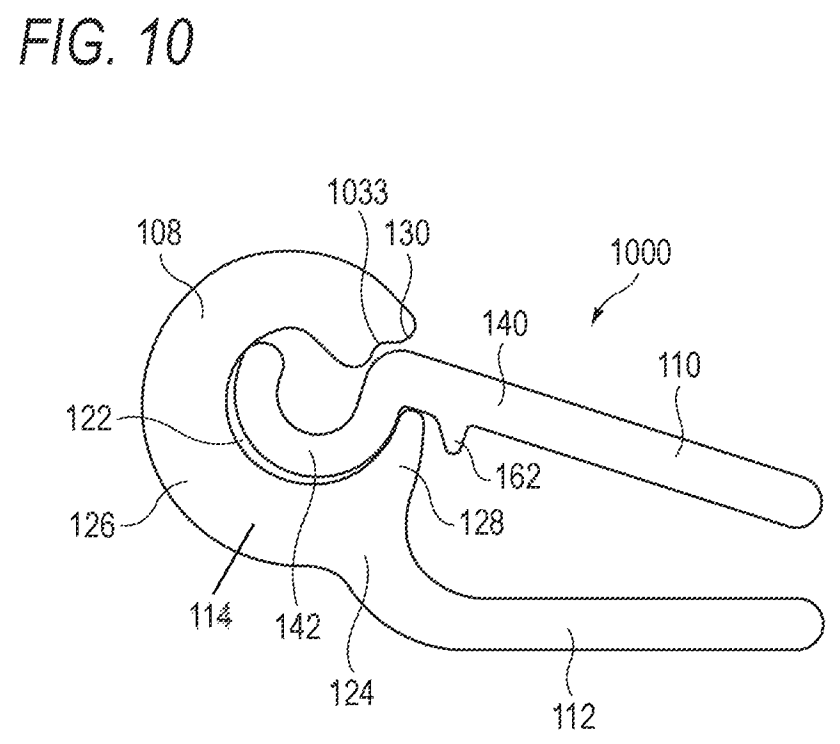

In the fully assembled position, the head 142 is fully positioned within the first recess 122. As illustrated in FIG. 3, in the fully assembled position, at least the projection 128 maintains contact with the head 142. In various embodiments, the first recess surface 136 may maintain contact with the outer surface 158 of the head 142 when the head 142 is in the fully assembled position. In certain embodiments, the head 142 and the projection 128 may maintain contact when the head edge 150 contacts the first recess surface 136 in the fully assembled position and/or in the temporary position. In certain aspects, the contact maintained between the projection 128 and the head 142 in the fully assembled position may secure the second member 110 relative to the first member 108 and may improve the engagement strength of the sheet fastener 100. In various embodiments, the contact between the projection 128 and the head 142 may also maintain an axis of rotation for the second member 110 relative to the first member 108. In certain embodiments, the axis of rotation may be the center 131 of the first recess 122, and the second member 110 may rotate around the center 131 of the first recess 122 of the first member 108. In other embodiments, the axis of rotation need not be the center 131 of the first recess 122. In various embodiments, in the fully assembled position, the projection edge 132 may be between the head 142 and the projection 162, although it need not be depending on a rotational position of the second member 110 relative to the first member 108. In some embodiments, the support portion edge 130 of the holder 114 may contact a portion of the second fixing portion 140 and/or the head 142. In the embodiment illustrated in FIG. 2, for example, the support portion edge 130 contacts a portion of the second fixing portion 140 proximate to the head 142. In other embodiments, and as illustrated in FIG. 10, the support portion edge 130 may contact both the head 142 and the second fixing portion 140. In the embodiment of FIG. 10, the support portion edge 130 may include a groove 1033 that can accommodate the transition between the second fixing portion 140 and the head 142, although in other embodiments the support portion edge 130 may have various suitable profiles or shapes as desired. In yet other embodiments, the support portion edge 130 may only contact the head 142. In various aspects, such contact between the support portion edge 130 and the second fixing portion 140 may restrict the second member 110 from rotating relative to the first member 108 to maintain a stable connection.

Figures 6, 7:
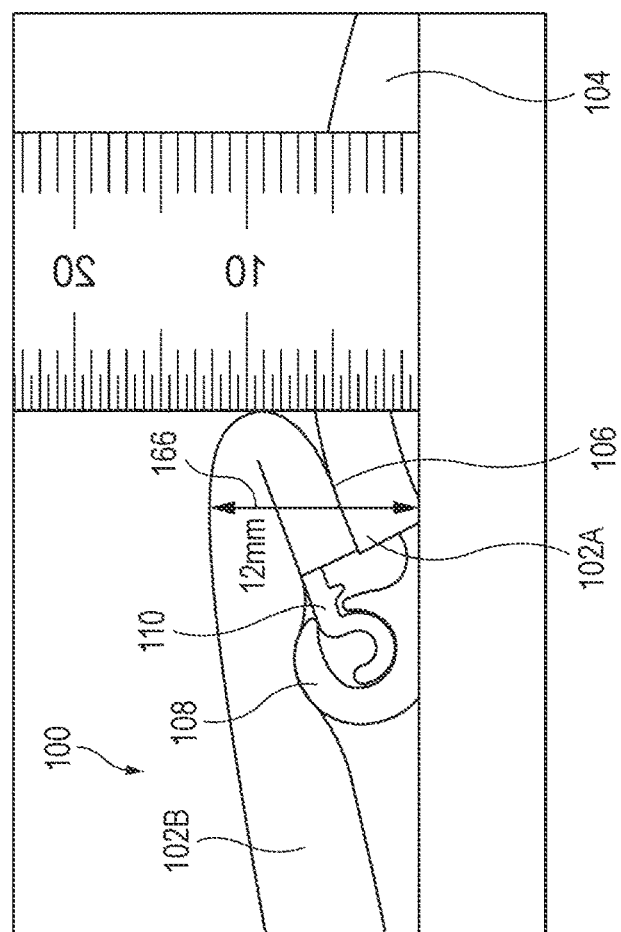
FIG. 6 is a side view of the covering material and sheet fastener of FIG. 1 illustrating the overall thickness of the joined region including the overlaid edges according to embodiments of the disclosure.
FIG. 7 is a side view of the covering material and sheet fastener of FIG. 1 illustrating the thickness of a gap between the overlaid edges joined by the sheet fastener according to embodiments of the disclosure.

Referring to FIGS. 6 and 7, the sheet fastener 100 in the fully engaged position may provide an improved appearance to the edges 102A and 102B joined by the sheet fastener 100 by reducing a thickness 166 of the seam 106 (FIG. 6) and by reducing a thickness of a gap 168 (FIG. 7) between the fastened edges 102A and 102B. In one non-limiting example, the thickness 166 of the seam 106 is about 12 mm, although it need not be in other examples. In one non-limiting example, a thickness of the gap 168 is about 2 mm, although it need not be in other examples.

Figures 8, 9:
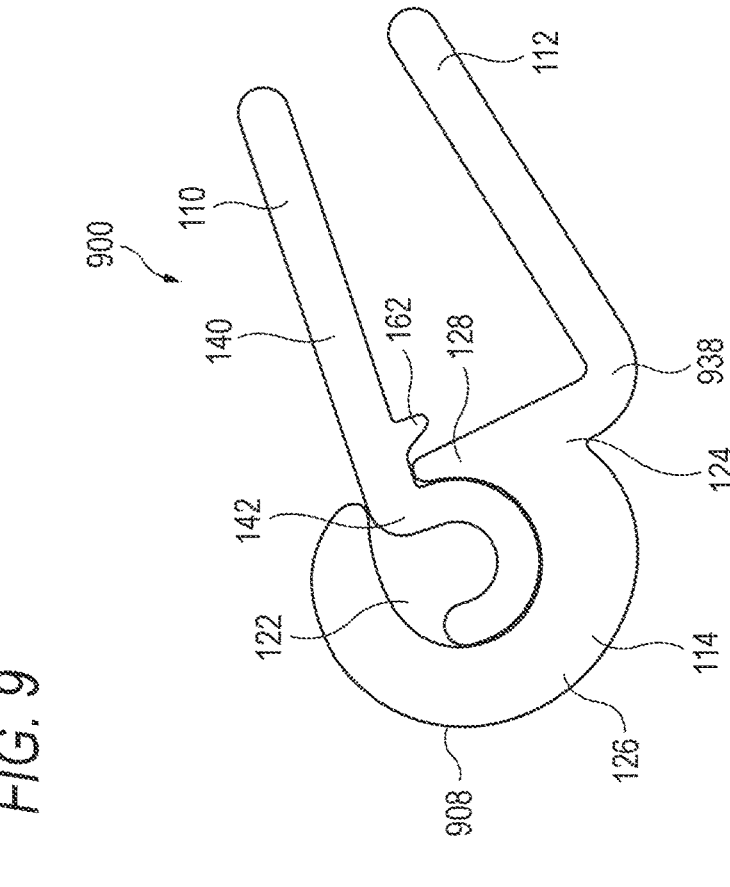
FIG. 8 is a bottom view of a headrest for a seat that includes a covering material of FIG. 1.
FIG. 9 is a side view of another sheet fastener including a first member and a second member according to embodiments of the disclosure.

FIG. 8 illustrates an example of a headrest 801 having a seam 806 in a covering material 804 that is substantially similar to the seam 106 in the covering material 104 and that is formed by a sheet fastener (not visible) similar to the sheet fastener 100.

FIG. 9 illustrates an example of a sheet fastener 900 that is substantially similar to the sheet fastener 100 except that a step portion 938 of a first member 908 has a different shape and is more squared compared to the step portion 138 of the first member 108 of the sheet fastener 100.

FIG. 10 illustrates an example of a sheet fastener 1000 that is substantially similar to the sheet fastener 100 except that the support portion edge 130 of the first member 108 is configured to contact both the head 142 and the second fixing portion 140 of the second member 110 and includes a groove 1033.

Referring back to FIGS. 1 to 7, a method of fastening the pair of edges 102A and 102B with the sheet fastener 100 may include fixing the sheet edge 102A on the first fixing surface 118 and fixing the sheet edge 102B on the second fixing surface 146. The head 142 of the second member 110 is moved toward the holder 114 of the first member 108, and the head edge 150 is inserted into the first recess 122 and into contact with the first recess surface 136 such that the second member 110 is in the temporary position. In certain aspects, inserting the head edge 150 into the first recess 122 inserts the support portion edge 130 into the second recess 152 to contact with the second recess surface 160. In various embodiments, in the temporary position, the edges 102A and 102B may be adjusted as desired prior to applying tension to the edges 102A and 102B. As some non-limiting examples, creases, sags and the like of the edges 102A and 102B may be removed while the sheet fastener 100 and edges 102A and 102B are in the temporary position.

The second member 110 may be rotated relative to the first member 108 such that the second fixing portion 140 is brought closer to the first fixing portion 112. In various embodiments, the second member 110 may be rotated about an axis of rotation relative to the first member 108, and the axis of rotation may be the center 131 of the first recess 122. Rotation of the second member 110 may further insert the head 142 of the second member 110 into the first recess 122. Rotation of the second member 110 also applies tension to the sheet edge 102B as the second fixing portion 140 is brought closer to the first fixing portion 112. In various embodiments, during rotation of the second member 110, the projection 128 may optionally maintain contact with the head 142.

As a result of the rotation of the second member 110, the second member 110 is moved from the temporary position to the fully assembled position. In the fully assembled position, the projection 128 may maintain contact with the head 142, and the outer surface 158 of the head 142 may contact the first recess surface 136 in addition to the projection 128 (e.g., at a location opposite from the projection 128). In the fully assembled position, the support portion edge 130 may contact the second fixing portion 140, the head 142, or both the second fixing portion 140 and the head 142. In various embodiments, in the fully assembled position, the contact between the support portion edge 130 and the second fixing portion 140, the head 142, or both the second fixing portion 140 and the head 142 may restrict the second member 110 from rotating relative to the first member 108 to maintain a stable connection. Accordingly, the first member 108 and the second member 110 are reliably connected so that the edges 102A and 102B are fastened while being close to each other.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

The invention claimed is:

1. A sheet fastener for fastening a pair of sheet edges, the sheet fastener comprising:
   a first member comprising:
      a first fixing portion configured to engage a first edge of the pair of sheet edges; and
      a holder continuous with the first fixing portion, wherein the holder defines a first recess and comprises a projection and a support portion, wherein the projection and the support portion define an opening to the first recess; and
   a second member comprising:
      a second fixing portion configured to engage a second edge of the pair of sheet edges; and
      a head continuous with the second fixing portion, wherein the head comprises a front edge opposite from the second fixing portion and a head surface extending from the second fixing portion to the front edge, wherein:
   the head of the second member is insertable into the first recess of the holder such that a portion of the head surface maintains contact with the projection of the holder,
   the support portion of the holder extends from a connecting portion of the holder, and the projection of the holder extends from the connecting portion in a direction opposite from the support portion,
   the first member includes a step portion between the first fixing portion and the holder and continuous with the first fixing portion and the holder, and
   the step portion offsets the connecting portion of the holder such that an entirety of the holder is above or below the first fixing portion of the first member, and
   the support portion includes a support portion edge, and the support portion edge contacts the second fixing portion.

2. The sheet fastener according to claim 1, wherein a curvature of the head surface of the head is complementary to a curvature of a surface of first recess.

3. The sheet fastener according to claim 1, wherein a second fixing surface of the second fixing portion extends in a second plane, and the front edge of the head is offset from the second plane such that a vertical gap is defined between the second plane and the front edge.

4. The sheet fastener according to claim 1, wherein the second fixing portion includes an end of the second member, and the head is provided opposite from the end,
   the second member includes a projection extending from the second fixing portion between the end and the head of the second member, and
   a portion of the projection of the holder of the first member is received between the projection and the head of the second member when the second member is fully assembled with the first member.

* * * * *